United States Patent [19]

Barron et al.

[11] Patent Number: 5,586,084
[45] Date of Patent: Dec. 17, 1996

[54] MUD OPERATED PULSER

[75] Inventors: Charles D. Barron, Kingwood; Wallace R. Gardner, Houston, both of Tex.

[73] Assignee: Halliburton Company, Dallas, Tex.

[21] Appl. No.: 359,622

[22] Filed: Dec. 20, 1994

[51] Int. Cl.[6] ............................ H04H 9/00; G01V 1/40; G01V 1/137
[52] U.S. Cl. ............................ 367/85; 367/912; 181/102
[58] Field of Search ............................ 367/85, 134, 912; 181/102; 175/50; 166/250

[56] References Cited

U.S. PATENT DOCUMENTS

| | | | |
|---|---|---|---|
| 3,958,217 | 5/1976 | Spinnler | 367/85 |
| 4,686,658 | 8/1987 | Davison | 367/85 |
| 4,742,498 | 5/1988 | Barron | 367/85 |
| 4,771,408 | 9/1988 | Kotlyar | 367/83 |
| 5,073,877 | 12/1991 | Jeter | 367/84 |
| 5,333,686 | 8/1994 | Vaughan et al. | 367/85 |

*Primary Examiner*—Nelson Moskowitz
*Attorney, Agent, or Firm*—Michael F. Heim

[57] ABSTRACT

A poppet and orifice mud pulser assembly is disclosed for use in an MWD system. The mud pulser is capable of generating pressure pulses in the column of drilling mud of various amplitudes to increase the data rate of the mud pulse telemetry system. The mud pulser includes a piston assembly that positions the poppet with respect to the orifice. The piston assembly comprises part of a by-pass conduit which defines a mud flow path around the orifice. Mud flow in the piston assembly generates a force tending to shut the poppet, because the surface area of the piston $A_2$ is greater than the surface area of the poppet $A_1$. Mud flow through the conduit (and thus through the piston) tends to force the poppet into a closed position because the force on the piston is greater than the force on the poppet, because of the greater surface area of the piston. A pilot valve is provided to enable and disable flow through the conduit, thus allowing the poppet to open and close. Other amplitude level signals are generated by permitting the poppet to partially open through the implementation of a plurality of parallel pressure relief valves, each of which is set with a different pressure relief value. The pressure relief valves are selected by an associated selector valve. Selection of a pressure relief valve prevents pressure within the piston from exceeding the pressure relief valve, which causes the poppet to partially open, thereby changing the pressure pulse amplitude generated. Alternatively, a motor operated pressure control valve may be used to vary the amplitude of the pressure pulse, thereby permitting the generation of waveforms of any shape.

32 Claims, 4 Drawing Sheets

MUD OPERATED PULSER

BACKGROUND OF THE INVENTION

The present invention relates generally to a telemetry system for transmitting data from a downhole drilling assembly to the surface of a well during drilling operations. More particularly, the present invention relates to a pilot operated mud pulsing valve for use in a measurement while drilling ("MWD") system or a logging while drilling ("LWD") system to transmit downhole measurements to the surface of the well during drilling operations through the medium of the drilling fluid. Still more particularly, the present invention relates to a mud pulsing valve capable of generating multiple bits of data in a single pulse to increase the bandwidth of the mud pulse telemetry system.

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a driller regarding the particular earth formation being drilled. In conventional oil well wireline logging, a probe or "sonde" housing formation sensors is lowered into the borehole after some or all of the well has been drilled, and is used to determine certain characteristics of the formations traversed by the borehole. The sonde is supported by a conductive wireline, which attaches to the sonde at the upper end. Power is transmitted to the sensors and instrumentation in the sonde through the conductive wireline. Similarly, the instrumentation in the sonde communicates information to the surface by electrical signals transmitted through the wireline.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. By collecting and processing data during the drilling process, without the necessity of removing or tripping the drilling assembly to insert a wireline logging tool, the driller can make accurate modifications or corrections, as necessary, to optimize performance while minimizing down time. Designs for measuring conditions downhole and the movement and location of the drilling assembly, contemporaneously with the drilling of the well, have come to be known as "measurement-while-drilling" techniques, or "MWD." Similar techniques, concentrating more on the measurement of formation parameters, commonly have been referred to as "logging while drilling" techniques, or "LWD." While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

Drilling oil and gas wells is carried out by means of a string of drill pipes connected together so as to form a drill string. Connected to the lower end of the drill string is a drill bit. The bit is rotated and drilling accomplished by either rotating the drill string, or by use of a downhole motor near the drill bit, or by both methods. Drilling fluid, termed mud, is pumped down through the drill string at high pressures and volumes (such as 3000 p.s.i. at flow rates of up to 1400 gallons per minute) to emerge through nozzles or jets in the drill bit. The mud then travels back up the hole via the annulus formed between the exterior of the drill string and the wall of the borehole. On the surface, the drilling mud is cleaned and then recirculated. The drilling mud is used to cool the drill bit, to carry cuttings from the base of the bore to the surface, and to balance the hydrostatic pressure in the rock formations.

When oil wells or other boreholes are being drilled, it is frequently necessary or desirable to determine the direction and inclination of the drill bit and downhole motor so that the assembly can be steered in the correct direction. Additionally, information may be required concerning the nature of the strata being drilled, such as the formation's resistivity, porosity, density and its measure of gamma radiation. It is also frequently desirable to know other down hole parameters, such as the temperature and the pressure at the base of the borehole, as examples. Once these data are gathered at the bottom of the bore hole, it is typically transmitted to the surface for use and analysis by the driller.

In LWD systems sensors or transducers typically are located at the lower end of the drill string which, while drilling is in progress, continuously or intermittently monitor predetermined drilling parameters and formation data and transmit the information to a surface detector by some form of telemetry. Typically, the down hole sensors employed in MWD applications are positioned in a cylindrical drill collar that is positioned close to the drill bit. The LWD system then employs a system of telemetry in which the data acquired by the sensors is transmitted to a receiver located on the surface. There are a number of telemetry systems in the prior art which seek to transmit information regarding downhole parameters up to the surface without requiring the use of a wireline tool. Of these, the mud pulse system is one of the most widely used telemetry systems for MWD applications.

The mud pulse system of telemetry creates acoustic signals in the drilling fluid that is circulated under pressure through the drill string during drilling operations. The information that is acquired by the downhole sensors is transmitted by suitably timing the formation of pressure pulses in the mud stream. The information is received and decoded by a pressure transducer and computer at the surface.

In a mud pressure pulse system, the drilling mud pressure in the drill string is modulated by means of a valve and control mechanism, generally termed a pulser or mud pulser. The pulser is usually mounted in a specially adapted drill collar positioned above the drill bit. The generated pressure pulse travels up the mud column inside the drill string at the velocity of sound in the mud. Depending on the type of drilling fluid used, the velocity may vary between approximately 3000 and 5000 feet per second. The rate of transmission of data, however, is relatively slow due to pulse spreading, distortion, attenuation, modulation rate limitations, and other disruptive forces, such as the ambient noise in the drill string. A typical pulse rate is on the order of a pulse per second (1 Hz). As shown for example in FIG. 1, the mud pulse signal is comprised of a pressure pulse at one of two amplitudes, indicating whether the mud pulser or "poppet" is open or closed. If the poppet is closed, a high pressure pulse is generated, to indicate, for example, a digital "1." If the poppet is opened, a digital "0" is indicated. The primary method of increasing the data rate of the transmitted signal is to increase the frequency f of the pulses. As the frequency f of the pulses increases, however, it becomes more and more difficult to distinguish between adjacent pulses because the resolution period is too short. The problem is that the period T for each individual pulse has decreased proportionately (T=1/f). The resolution therefore decreases, causing problems with detection of the adjacent pulses at the surface. Representative examples of mud pulse telemetry systems may be found in U.S. Pat. Nos. 3,949,354, 3,958,217, 4,216,536, 4,401,134, and 4,515,225.

Mud pressure pulses can be generated by opening and closing a valve near the bottom of the drill string so as to momentarily restrict the mud flow. In a number of known MWD tools, a "negative" pressure pulse is created in the fluid by temporarily opening a valve in the drill collar so that some of the drilling fluid will bypass the bit, the open valve allowing direct communication between the high pressure fluid inside the drill string and the fluid at lower pressure returning to the surface via the exterior of the string.

Alternatively, a "positive" pressure pulse can be created by temporarily restricting the downwardly flow of drilling fluid by partially blocking the fluid path in the drillstring. Whatever type of pulse system is employed, detection of the pulses at the surface is sometimes difficult due to attenuation and distortion of the signal and the presence of noise generated by the mud pumps, the downhole mud motor and elsewhere in the drilling system. Typically, a pressure transducer is mounted directly on the line or pipe that is used to supply the drilling fluid to the drill string. An access port or tapping is formed in the pipe, and the transducer is threaded into the port. With some types of transducers, a portion of the device extends into the stream of flowing mud where it is subject to wear and damage as a result of the abrasive nature and high velocity of the drilling fluid. In any case, the transducer detects variations in the drilling mud pressure at the surface and generates electrical signals responsive to these pressure variations.

Both the positive and negative mud pulse systems typically generate base band signals. In an attempt to increase the data rate and reliability of the mud pulse signal, other techniques also have been developed as an alternative to the positive or negative pressure pulses generated. One early system is that disclosed in U.S. Pat. No. 3,309,656, which used a downhole pressure pulse generator or modulator to transmit modulated signals, carrying encoded data, at acoustic frequencies to the surface through the drilling fluid or drilling mud in the drill string. In this and similar types of systems, the downhole electrical components are powered by a downhole turbine generator unit, usually located downstream of the modulator unit, that is driven by the flow of drilling fluid. These type of devices typically are referred to as mud sirens. Other examples of such devices may be found in U.S. Pat. Nos. 3,792,429, 4,785,300 and Re. No. 29,734. One problem with these mud siren type of modulators is the difficulty in retrieving and distinguishing the frequency modulated signals at the surface.

None of the prior art devices to date have been capable of providing an increased bandwidth signal in a form that provides easy delineation at the surface of the well.

SUMMARY OF THE INVENTION

The present invention solves the shortcomings and deficiencies of the prior art by providing a mud pulse system that transmits mud pulse signals of varying amplitudes. In one embodiment, multi-level (more than two) signals may be generated downhole in the pulser by providing a plurality n of parallel pressure control valves to produce n pressure amplitude levels. By increasing the number of available pressure pulse amplitudes, the quantity of data encoded (or the number of bits transmitted) can be increased dramatically without increasing the frequency of the transmitted signal.

The mud pulser preferably includes a poppet and orifice structure, which has a tendency to remain in the closed position. This tendency is obtained by providing a mud flow path bypassing the poppet and orifice, and through the interior of the piston. The piston is designed with a surface area $A_2$ that is greater than the surface area $A_1$ of the poppet. As a result, the piston tends to remain in its extended position, causing the poppet valve to shut. The poppet valve opens by a pilot valve connected on the by-pass conduit of the piston assembly. When the pilot valve turns off, mud flow is blocked through the piston assembly, causing the piston to retract as the pressure on the poppet exceeds the pressure within the piston.

In the preferred embodiment, n pressure relief valves connect to the by-pass conduit downstream of the piston. Each of the pressure relief valves are calibrated to a particular pressure level, which causes each valve to leak mud to prevent the calibrated pressure level from being exceeded. Each pressure relief valve has an associated selector valve for activating the associated pressure relief valve. Selection of a pressure relief valve causes a pressure pulse with an independent amplitude valve.

In an alternative embodiment, a motor operated pressure relief valve is provided in place of the parallel pressure relief valves. The motor operated valves permits incremental and continuous variations of the mud pressure. As a result, multi-level pressure amplitudes can readily be generated. In addition, the motor operated pressure relief valve also permits a variety of waveforms and frequencies to be generated, thereby greatly expanding the amount of information that can be transmitted, while permitting optimization of the waveform to facilitate data recovery at the surface.

BRIEF DESCRIPTION OF THE DRAWINGS

For a more detailed description of the preferred embodiment of the present invention, reference will now be made to the accompanying drawings, wherein.

During the course of the following description, the terms "upstream" and "downstream" are used to denote the relative position of certain components with respect to the direction of flow of the drilling mud. Thus, where a term is described as upstream from another, it is intended to mean that drilling mud flows first through the first component before flowing through the second component. Similarly, the terms such as "above," "upper" and "below" are used to identify the relative position of components in the bottom hole assembly, with respect to the distance to the surface of the well, measured along the borehole path.

DETAILED DESCRIPTION OF THE PREFERRED EMBODIMENT

Figure 1:
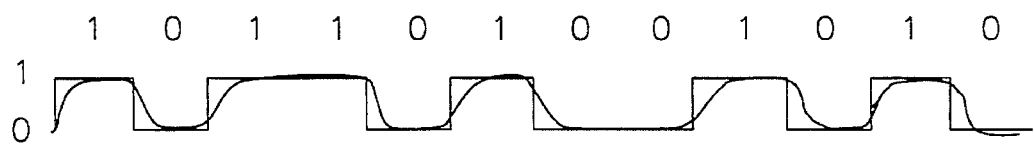
FIG. 1 illustrates a waveform generated by various prior art mud pulse telemetry systems.
Figure 2:
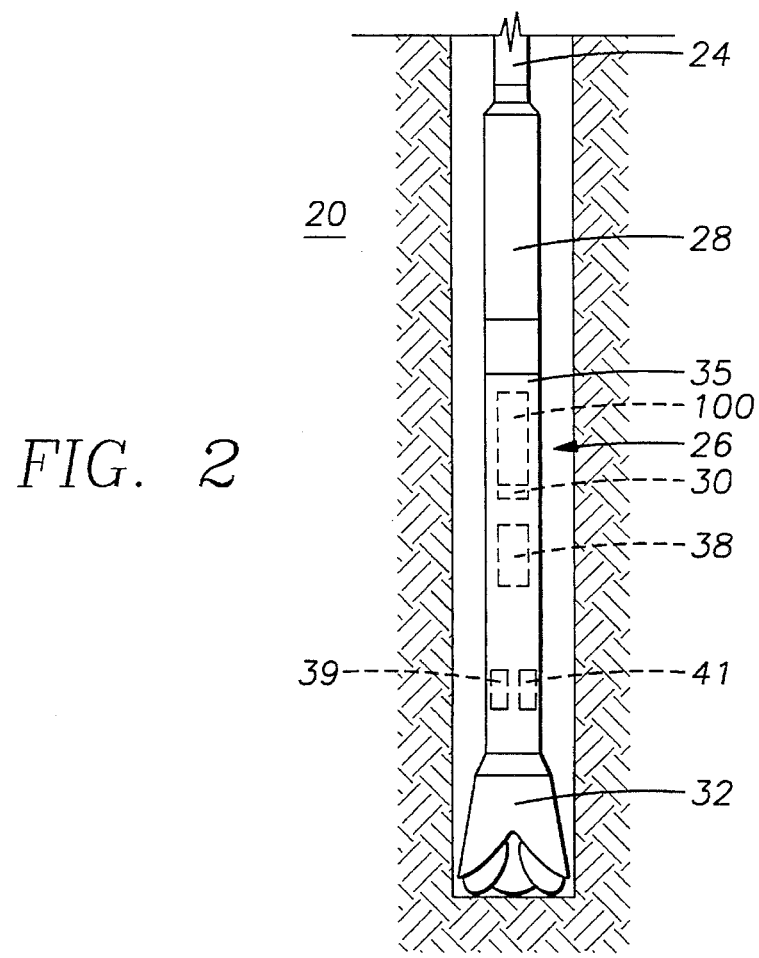
FIG. 2 is a schematic view of a drilling assembly implementing a mud siren modulator assembly as part of a measurement while drilling (or "MWD") system in accordance with the present invention.

Referring now to FIG. 2, a typical drilling installation is illustrated which includes a drilling rig 10, constructed at the surface 12 of the well, supporting a drill string 14. The drill string 14 penetrates through a rotary table 16 and into a borehole 18 that is being drilled through earth formations 20. The drill string 14 includes a kelly 22 at its upper end, drill pipe 24 coupled to the kelly 22, and a bottom hole assembly 26 (commonly referred to as a "BHA") coupled to the lower end of the drill pipe 24. The BHA 26 typically includes drill collars 28, a MWD tool 30, and a drill bit 32 for penetrating through earth formations to create the borehole 18. In operation, the kelly 22, the drill pipe 24 and the BHA 26 are rotated by the rotary table 16. Alternatively, or in addition to the rotation of the drill pipe 24 by the rotary table 16, the BHA 26 may also be rotated, as will be understood by one skilled in the art, by a downhole motor. The drill collars are used, in accordance with conventional techniques, to add weight to the drill bit 32 and to stiffen the BHA 26, thereby enabling the BHA 26 to transmit weight to the drill bit 32 without buckling. The weight applied through the drill collars to the bit 32 permits the drill bit to crush and make cuttings in the underground formations.

As shown in FIG. 2, the BHA 26 preferably includes a measurement while drilling system (referred to herein as "MWD") tool 30, which may be considered part of the drill collar section 28. As the drill bit 32 operates, substantial quantities of drilling fluid (commonly referred to as "drilling mud") are pumped from a mud pit 34 at the surface through the kelly hose 37, into the drill pipe, to the drill bit 32. The drilling mud is discharged from the drill bit 32 and functions to cool and lubricate the drill bit, and to carry away earth cuttings made by the bit. After flowing through the drill bit 32, the drilling fluid rises back to the surface through the annular area between the drill pipe 24 and the borehole 18, where it is collected and returned to the mud pit 34 for filtering. The circulating column of drilling mud flowing through the drill string also functions as a medium for transmitting pressure pulse wave signals, carrying information from the MWD tool 30 to the surface.

Typically, a downhole data signalling unit 35 is provided as part of the MWD tool 30 which includes transducers mounted on the tool that take the form of one or more condition responsive sensors 39 and 41, which are coupled to appropriate data encoding circuitry, such as an encoder 38, which sequentially produces encoded digital data electrical signals representative of the measurements obtained by sensors 39 and 41. While two sensors are shown, one skilled in the art will understand that a smaller or larger number of sensors may be used without departing from the principles of the present invention. The sensors are selected and adapted as required for the particular drilling operation, to measure such downhole parameters as the downhole pressure, the temperature, the resistivity or conductivity of the drilling mud or earth formations, and the density and porosity of the earth formations, as well as to measure various other downhole conditions according to known techniques. See generally "State of the Art in MWD," International MWD Society (Jan. 19, 1993).

The MWD tool 30 preferably is located as close to the bit 32 as practical. Signals representing measurements of borehole dimensions and drilling parameters are generated and stored in the MWD tool 30. In accordance with the preferred embodiment of this invention, the data signalling unit 35 preferably includes a transmitter assembly 100 to selectively interrupt or obstruct the flow of drilling mud through the drill string 14, to thereby produce encoded pressure pulses in the form of acoustic wave signals. The transmitter assembly 100 is selectively operated in response to the data encoded electrical output of the encoder 38 to generate a corresponding encoded wave signal. This encoded signal is transmitted to the well surface through the medium of the drilling mud flowing in the drill string, as a series of pressure pulse signals, which preferably are encoded representations of measurement data indicative of the downhole drilling parameters and formation characteristics measured by sensors 39 and 41. The presence or absence of a pressure pulse in a particular interval or transmission bit preferably is used to indicate a binary "0" or a binary "1" in accordance with conventional techniques. When these pressure pulse signals are received at the surface, they are detected, decoded and converted into meaningful data by a conventional acoustic signal transducer (not shown).

Figure 3:
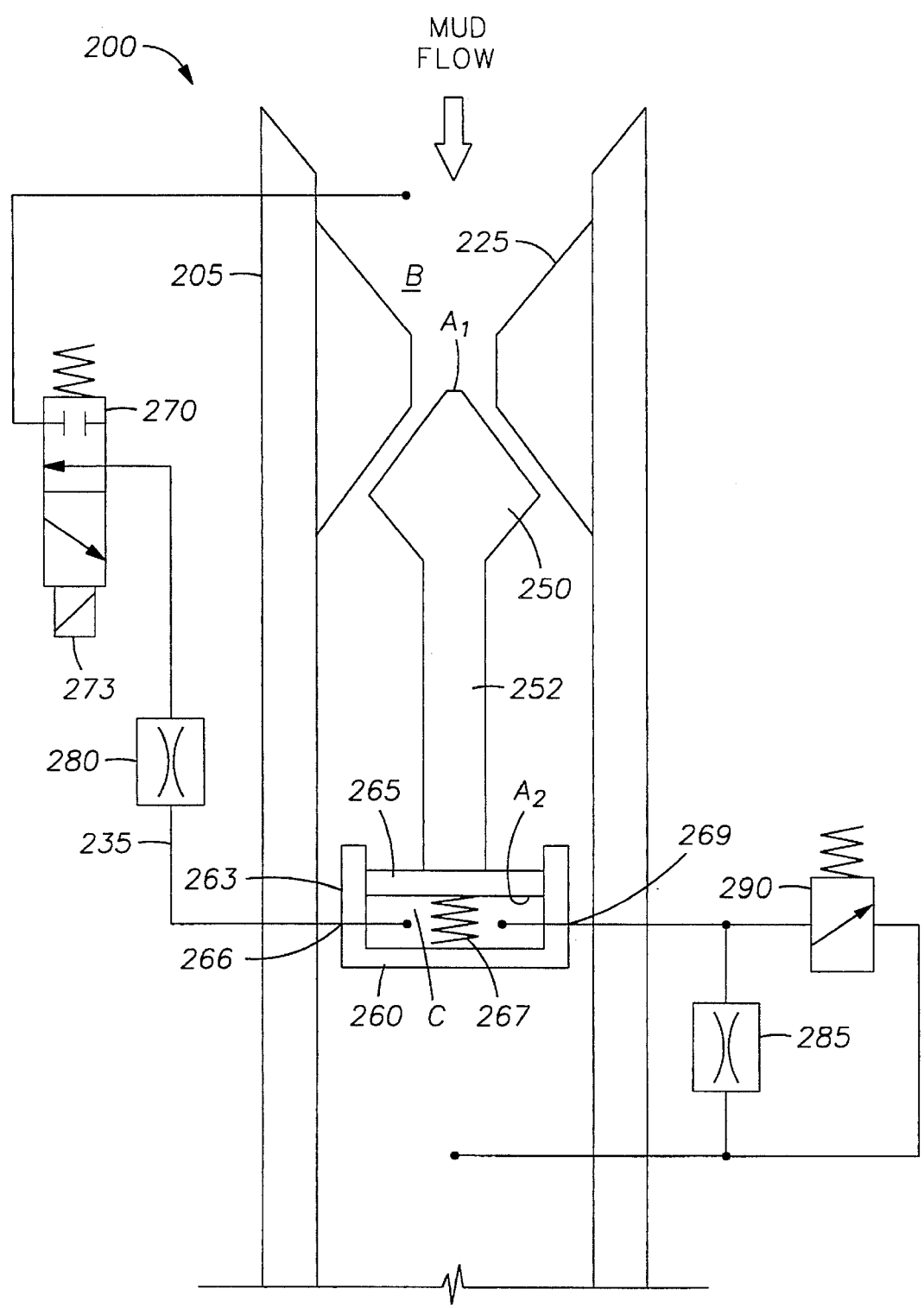
FIG. 3 is a schematic view of a poppet valve assembly constructed in accordance with the basic principles of the present invention.

Referring now to FIG. 3, the transmitter assembly 100 constructed in accordance with the principles of the present invention includes a mud pulse valve 200 for modulating signals in the form of pressure waves in the mud. The mud pulse valve 200 shown in FIG. 3 is an improved poppet valve assembly, but only is capable of generating a two level mud pulse signal. The improved design of FIG. 3, however, facilitates the implementation of the multi-level mud pulser, which results from the preferred embodiment of FIG. 4. The mud pulse valve 200 preferably comprises a generally cylindrical housing 205 containing a poppet 250, an orifice 225, and a conduit 235 providing a by-pass around the poppet 250 and orifice 225. Typically, drilling mud flows through the mud pulse valve 200 by flowing through the orifice 225. The flow of mud, however, may be obstructed by the poppet 250. The orifice 225 preferably provides a restricted passage for the drilling mud through the mud pulse valve 200.

In the preferred embodiment, the upper portion of the poppet has a surface area, designated as $A_1$. As will be understood by one skilled in the art, the force $F_1$ exerted by the mud is based upon the mud pressure $P_B$ and the surface area $A_1$ of the poppet 250:

$$F_1 = P_B \times A_1 \tag{1}$$

The poppet also includes a shaft portion 252 that connects to a piston assembly 260, for controlling the position of the poppet 250 with respect to the orifice 225. The piston assembly 260 preferably comprises a generally cylindrical housing 263, with a spring 267 mounted within the interior of said housing, outwardly biasing a piston 265. The spring has a predetermined bias force represented as $F_K$. The housing includes an inlet port 266 and an outlet port 269 forming part of the conduit by pass path 235. In the preferred embodiment, the interior surface of piston 265 has a surface area $A_2$. The force $F_2$ exerted by the mud pressure $P_C$ on the interior surface of piston 265 is found as follows:

$$F_2 = P_C \times A_2 \qquad (2)$$

The conduit 235 provides a mud flow path through a pilot valve 270, orifice 280, piston assembly 260, and either through a pressure control valve 290 or orifice 285. The conduit 235 provides a by-pass path around orifice 225 and poppet 250. The pilot valve 270 functions to enable and disable mud flow through conduit 235. The pilot valve 270 preferably includes a solenoid 273 which connects electrically to a telemetry control module (not shown). Signals received from the telemetry control module energize and deenergize solenoid 273, opening and closing pilot valve 270.

Orifice 280 represents one or more flow restrictions in the conduit 235. The orifice 280 preferably functions to limit the flow of drilling mud through the conduit 235, so that the primary flow path is through the orifice 225 and poppet 250 structure. The conduit 235 also includes a flow path through the interior of the piston assembly 260 to provide a force $F_2$ tending to bias the poppet 250 to a closed position with respect to orifice 225.

The conduit path includes a pressure relief control valve 290 connected on the outlet port of the piston assembly 260. The pressure relief control valve 290 is set to a desired pressure, with the result that mud will leak through the pressure relief valve 290 when the pressure in the conduit 235 exceeds the preset value of the relief valve 290. An orifice 285 is included as an alternative path around relief valve 290, to permit the mud to bleed out of the piston assembly 260. As one skilled in the art will understand, the orifice 285 represents a flow restricted path to permit pressure to increase as required in conduit 235.

When mud first flows through the mud pulse valve, pressure will build at point B, above the poppet 250. When the force at point B ($F_1$) exceeds the preset bias force $F_K$ of piston spring 267, the poppet 250 will open, permitting mud flow through the orifice 225. If the pilot valve 270 is open, mud also will flow through conduit 235, into the interior of piston assembly 260. When the pressure within the piston assembly 260 (point C) becomes sufficiently high, which preferably occurs when the pressure at point C is equal to the pressure at point B, the piston 265 will extend, causing the poppet 250 to shut. This occurs because the area of the piston $A_2$ is greater than the area of the poppet $A_1$, so that $F_2 > F_1$. If the pressure in conduit becomes greater than the pressure relief control valve 290, then mud flows through relief valve 290 to maintain the pressure in conduit 235 below the preset value of valve 290.

If the pilot valve turns off, as would occur if the telemetry control module indicates that a digital "0" is to be transmitted, then mud flow is stopped through conduit 235. The mud pressure within the piston assembly 260 then drops, as mud bleeds out through orifice 285. As the pressure within the piston assembly 260 (point C) falls below the mud pressure above orifice 225 (point B), the poppet is forced open, dropping the pressure at point B. To transmit a digital "1", the pilot valve 270 is reopened by a signal from the telemetry control module, causing the poppet 250 to shut and increasing the pressure at point B. With this general understanding of the principles of the present invention, the preferred embodiment of the present invention now will be described with reference to FIG. 4.

Figure 4:
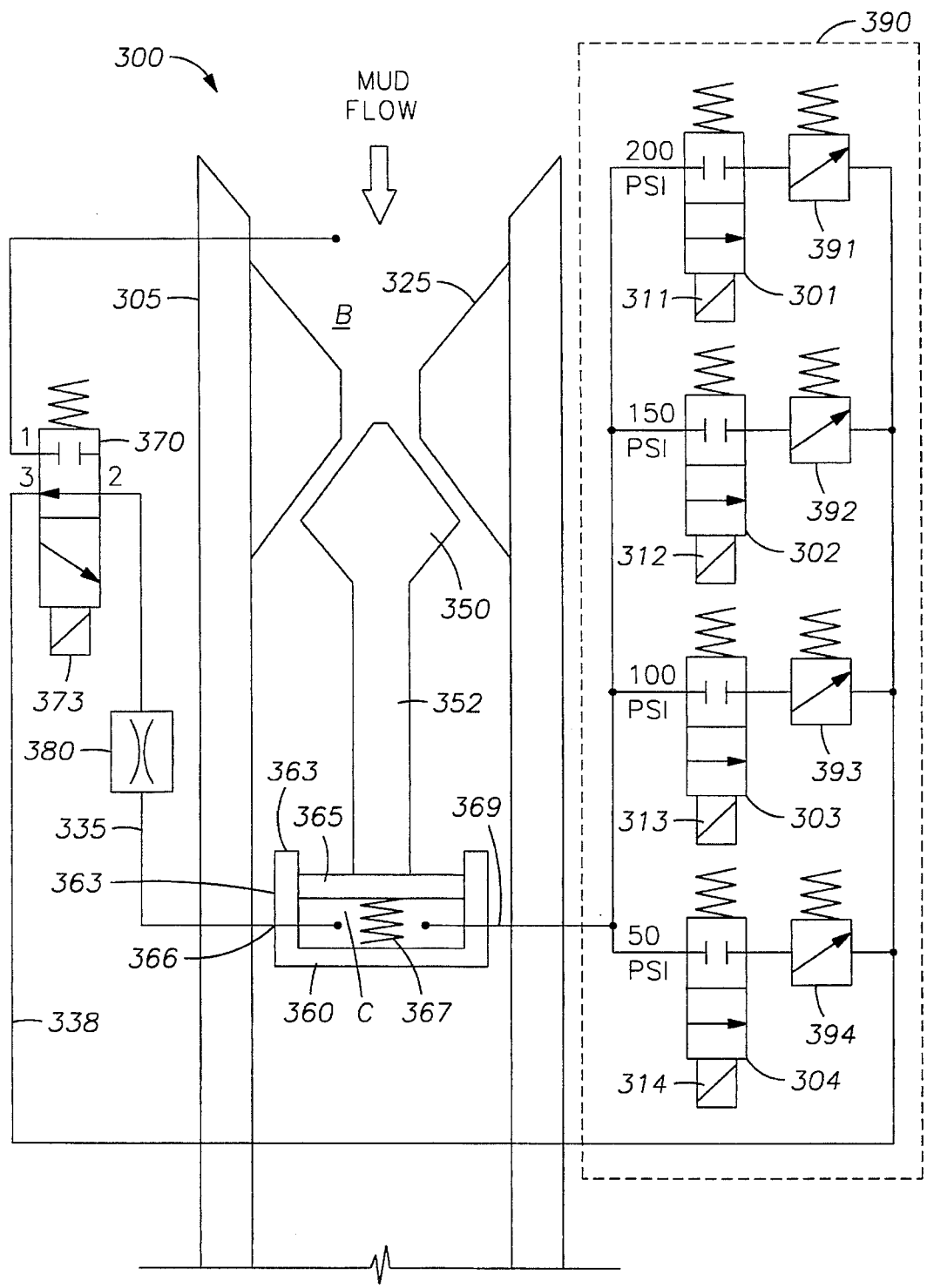
FIG. 4 is a schematic view of an exemplary multi-level poppet valve assembly constructed in accordance with the preferred embodiment.

The mud pulse valve 300 constructed in accordance with the preferred embodiment of FIG. 4 generally comprises an orifice 325, a popper 350, and a conduit path 335 through a pilot valve 370, a piston assembly 360 and a multiple pressure relief control valve section 390. As was the case with respect to the structure of FIG. 3, drilling mud typically flows through the mud pulse valve 300 by flowing through the orifice 325. Mud flow is partially or totally obstructed by the poppet 350.

Referring still to the preferred embodiment of FIG. 4, the upper portion of the poppet 350 has a surface area, designated as $A_1$. The force $F_1$ on the poppet 350 from the mud flow is determined by the mud pressure and the surface area of the poppet 350 according to equation (1), above. The poppet 350 includes a shaft portion 352 that connects to a piston assembly 360, for controlling the position of the poppet 350 with respect to the orifice 325. The piston assembly 360 preferably comprises a generally cylindrical housing 363, with a spring 367 mounted within the interior of said housing, outwardly biasing a piston 365. The housing includes an inlet port 366 and an outlet port 369 forming part of the conduit by-pass path 335. In the preferred embodiment, the interior surface of piston 365 has a surface area $A_2$. The force generated by the mud pressure within the piston 365 is found in accordance with equation (2), above.

The conduit 335 defines a mud flow path through pilot valve 370, orifice 380, piston assembly 360, and pressure control valve section 390. The conduit 335 provides a by-pass path around orifice 325 and poppet 350. The conduit 335 also includes a section 338 to provide a mud flow path from the piston assembly 360 to a point downstream of the poppet 350.

The pilot valve 370 preferably comprises a three-way valve that includes a solenoid 373 connecting electrically to a telemetry control module (not shown). Signals received from the telemetry control module energize and deenergize solenoid 373, opening and closing pilot valve 370. When the pilot valve 370 is open, a flow path is provided between point 1 and point 2, enabling mud flow into piston assembly 360. Conversely, when pilot valve 370 closes, a flow path is provided between point 2 and point 3, thus permitting mud to flow out of piston assembly 360 and back into the drillstring.

Orifice 380 represents one or more flow restrictions in the conduit 335. The orifice 380 functions to limit the flow of drilling mud through the conduit 335, so that the primary flow path is through the orifice 325 and poppet 350 structure. The conduit 335 also includes a flow path through the interior of the piston assembly 360 to provide a force tending to bias the poppet 350 to a closed position with respect to orifice 325.

The conduit path, as noted, includes a pressure relief control valve section 390 connected to the outlet port 369 of the piston assembly 360. The pressure relief control valve section 390 preferably comprises three or more pressure relief control valves to provide a multi-level mud pulse signal for transmission to the surface of the well. In the exemplary embodiment of FIG. 4, four pressure relief valves 391, 392, 393, 394 are provided. Each of the pressure relief valves preferably is set to a different pressure to represent the different amplitude values to be generated by the mud pulse valve 300.

Each of the pressure relief valves 391, 392, 393, 394 has an associated selector valve 301, 302, 303, 304, respectively, for permitting mud flow to the associated pressure relief valve. The selector valves 301, 302, 303, 304 each have a solenoid section 311, 312, 313, 314 for opening and closing the associated selector valve 301, 302, 303, 304. Each of the solenoids 311, 312, 313, 314 connect electrically to a telemetry control unit for receiving signals that indicate which selector switch to turn on to produce the desired pulse amplitude.

When mud first flows through the mud pulse valve 300, pressure will build at point B, above the poppet 350. When the force of the mud exceeds the preset bias force $F_K$ of piston spring 367, the poppet 350 will cause the poppet to open, letting mud through the orifice 325. If the pilot valve 370 is open, mud will also flow through conduit 335, into the interior of piston assembly 360. When the pressure within the piston assembly 360 (point C) becomes high enough, which preferably occurs when the pressure at point C is equal to the pressure at point B, the piston 365 will extend, causing the poppet 350 to tend to shut. This occurs because the area of the piston $A_2$ is greater than the area of the poppet $A_1$.

A pressure pulse is generated by selecting one of the pressure relief control valves 391, 392, 393, 394 by opening one of the selector valves 301, 302, 303, 304. If the pressure in the conduit 335 becomes greater than the selected pressure relief control valve, then mud flows through the selected relief valve to maintain the pressure in conduit 335 below the preset value of the selected valve. Limiting the pressure within the piston assembly 360 (point C) to a predefined pressure keeps the poppet 350 from closing, thereby permitting mud flow through the orifice 325. In the preferred embodiment, therefore, poppet 350 functions to partially block mud flow through the orifice. The amount that the poppet 350 blocks mud flow through the orifice 325 is determined by which pressure relief control valve is selected. Thus, for example, if pressure relief valve 394 is selected, only a certain pressure would be permitted within the piston assembly 360 to obtain a pressure at point B of, for example, 50 psi, which might indicate a value of "1". Conversely, if pressure relief valve 393 is selected, a greater pressure would be permitted within the piston assembly 360 to obtain a pressure at point B of, for example, 100 psi, which might indicate a value of "2". Selection of pressure relief valve 392 might produce a pressure at point B of 150 psi (for a value of "3"), while pressure relief valve 391 would result in a pressure of 200 psi, for a value of "4".

If the pilot valve 370 turns off, as would occur if the telemetry control module indicates that a "0" value is to be transmitted, then mud flow is stopped through conduit 335. The mud pressure within the piston assembly 360 then drops, as mud bleeds out through the pilot valve 370 into path 338. As the pressure within the piston assembly 360 (point C) falls, the poppet 350 is forced fully open, dropping the pressure at point B to its minimum possible value.

Figure 6:
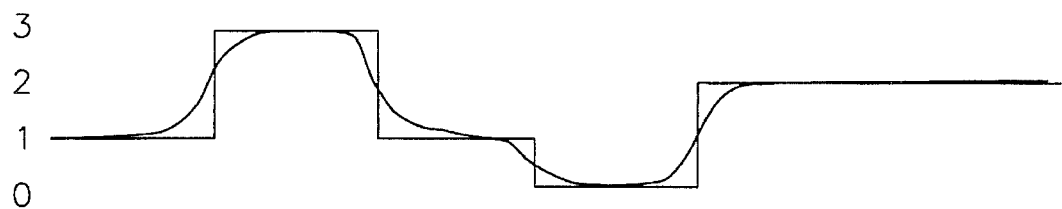
FIG. 6 illustrates a waveform generated by an exemplary multi-level poppet valve assembly constructed in accordance with the embodiment of FIG. 4.

Referring now to FIG. 6, an example of a mud pulse waveform that can be generated with a four level mud pulser valve is depicted. As shown in FIG. 6, the mud pulser in this example generates mud pressure pulses capable of denoting a level "0", a level "1", a level "2" and a level "3". As a result, four different signals can be transmitted during any pulse period. As will be understood by one skilled in the art, the use of a four level signal instead of a two level signal permits twice the data to be transmitted in any pulse period, because two digital bits of data can be transmitted during every pulse, as represented by $2^x=n$, where x represents the number of bits that can be transmitted, and n represents the number of available states. Other communication techniques may also be employed by one skilled in the art to further enhance the bandwidth of the signal.

Figure 5:
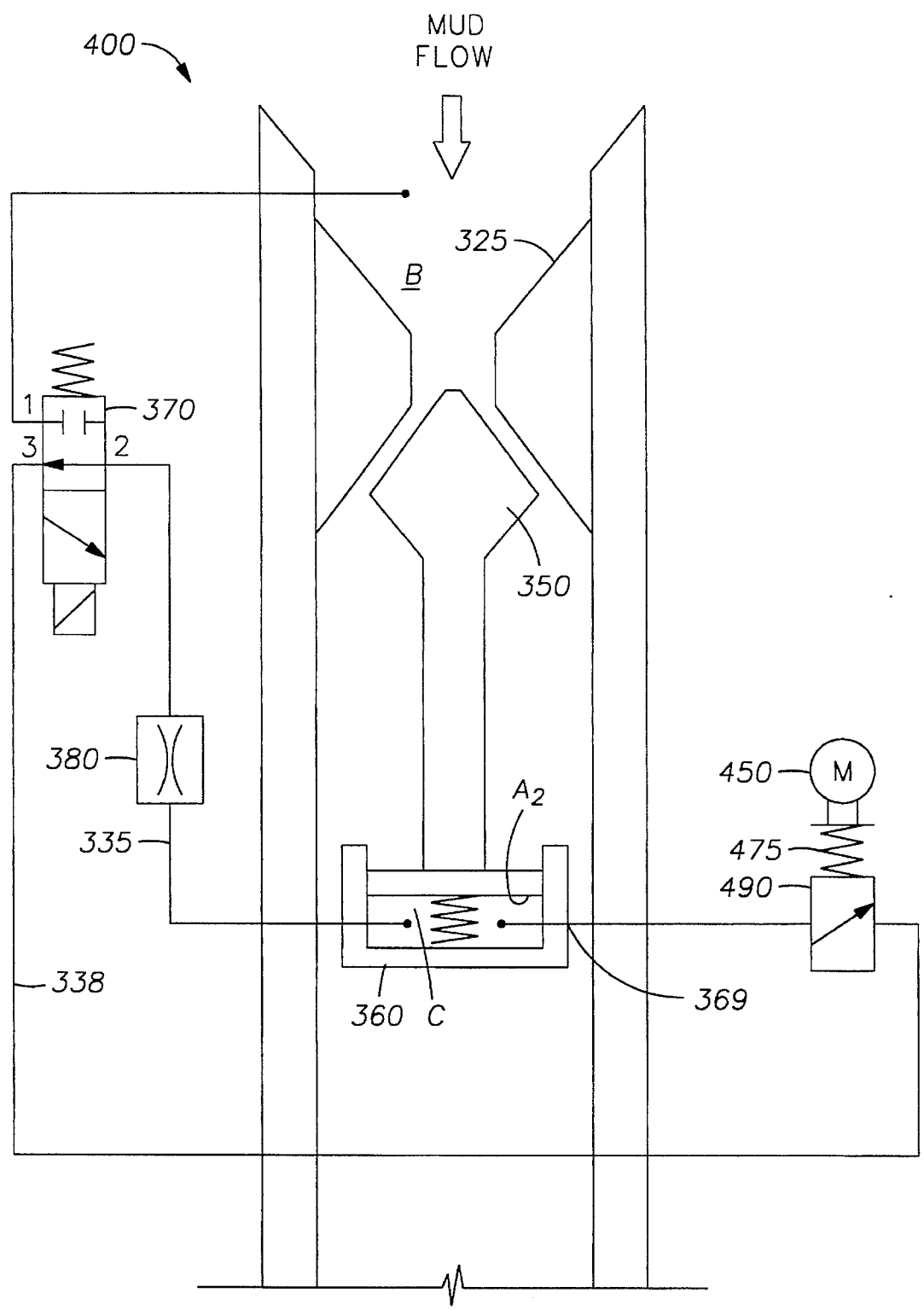
FIG. 5 is a schematic view of a multi-level poppet valve assembly constructed according to an alternative embodiment with a motor operated pressure relief control valve.

Referring now to FIG. 5, an alternative embodiment for a mud pulse valve 400 is shown for obtaining multi-level mud pulse signals. In FIG. 5, the multiple pressure relief control valve section (390 of FIG. 4) is replaced with a motor operated pressure control valve 490. The other components of FIG. 5 may be identical to those shown in FIG. 4, and thus the same reference numerals have been used to denoted those components.

Referring still to FIG. 5, the motor operated pressure control valve 490 connects to a motor 450. The motor 450 preferably comprises a variable torque motor, which is capable of varying the pressure setting of control valve 490. The pressure setting of valve 490 preferably is controlled by a spring 475, so that as the motor torque increases, so does the force applied by motor 450 to the spring 475. The force on spring 475 is applied to valve 490, causing the pressure setting of the control valve 490 to increase.

The torque at which the variable torque motor 450 operates preferably is determined by processing circuitry in the telemetry control module. In the preferred embodiment, a feedback signal from the mud pulser valve 400 is provided to the processing circuitry to enable the processing circuitry to precisely regulate the pressure setting of control valve 400. The feedback signal may indicate the pressure differential between points B, C, D, or may indicate the movement of spring 475. Other feedback signals also could be provided, as will be apparent to one skilled in the art.

By varying the setting of the pressure control valve 490, it is possible for mud pulse valve 400 to generate a varying amplitude signal, with a large number of available levels for transmitting information. The embodiment of FIG. 5 enables the pulser valve 400 to generate a variety of mud pulse signals of varying heights or forms to be transmitted to the surface to optimize signal recognition and data rates. For example, the mud pulse valve 400 could be used to generate passband telemetry signals like frequency shift keyed (FSK) signals, phase shift keyed (PSK) signals and quadrature amplitude modulation (QAM) signals.

While a preferred embodiment of the invention has been shown and described, modifications thereof can be made by one skilled in the art without departing from the spirit of the invention.

We claim:

1. A telemetry system for a bottomhole drilling assembly through which drilling mud flows during drilling operations, comprising:

a sensor for measuring parameters downhole, and producing a signal indicative thereof;

an encoder receiving said signal from said sensor and providing an encoded signal in response;

a mud pulser for generating acoustic signals in the drilling mud based on said encoded signal, said mud pulser comprising a device for generating acoustic signals with more than two amplitude levels to increase the data rate of transmission of said encoded signals: and wherein the mud pulser comprises a poppet and an orifice structure.

2. A system as in claim 1, wherein the position of the poppet relative to said orifice is controlled by a piston assembly.

3. A system as in claim 2, wherein the poppet has a face with a surface area $A_1$.

4. A system as in claim 3, wherein the mud pulser includes a by-pass conduit for by-passing the poppet and orifice structure.

5. A system as in claim 4, wherein the by-pass conduit defines a flow path through the piston assembly.

6. A system as in claim 5, wherein the piston assembly includes a piston with a surface area $A_2$.

7. A system as in claim 6, wherein $A_2$ is greater than $A_1$.

8. A system as in claim 2, wherein the mud pulser includes a by-pass conduit for by-passing the poppet and orifice structure, and said by-pass conduit passes inside said piston assembly.

9. A system as in claim 8, wherein said piston assembly has an inlet port and an outlet port defining a mud flow path through said piston assembly.

10. A system as in claim 9, further comprising a multiple pressure control valve section connected to the outlet port of said piston assembly, wherein said multiple pressure control valve section defines the available amplitude levels for the acoustic signal.

11. A system as in claim 10, wherein the multiple pressure control section includes a plurality of pressure relief valves, each of which are preset with a different pressure relief value.

12. A system as in claim 11, wherein each of said pressure relief valves has an associated selector switch for selectively permitting mud flow to the associated pressure relief valve.

13. A system as in claim 10, wherein the multiple pressure control section includes a motor operated pressure control valve.

14. A transmitter assembly for a mud pulse telemetry MWD system, comprising;

an outer housing;

an orifice fixedly positioned within said housing;

a poppet movably positioned within said housing to affect mud flow through said orifice, said poppet having a face with a surface area $A_1$; and a piston assembly connected to said poppet for controlling the position of said poppet relative to said orifice, said piston assembly including a piston having a surface area $A_2$;

a by-pass conduit defining a mud flow path by-passing said orifice and through said piston assembly;

a pilot valve for enabling and disabling mud flow through said by-pass conduit;

wherein mud flow through said by-pass conduit creates a force on said piston which is greater than the force on said poppet, causing said poppet to shut with respect to said orifice.

15. An assembly as in claim 14, further comprising a plurality of pressure relief valves in said by-pass conduit.

16. An assembly as in claim 15, wherein each of the pressure relief valves is set with a different relief pressure.

17. An assembly as in claim 16, wherein each of said different relief pressures on said pressure relief valves causes said poppet to open a different amount with respect to said orifice.

18. An assembly as in claim 14, further comprising as part of said by-pass conduit a pressure relief valve with a variable pressure setting.

19. An assembly as in claim 18, further comprising a motor connected to said variable pressure relief valve for controlling the pressure setting of said relief valve.

20. A mud pulser for an MWD system, comprising;

an orifice;

a poppet movably positioned with respect to said orifice, said poppet having a face with a surface area $A_1$; and a piston assembly connected to said poppet for controlling the position of said poppet relative to said orifice, said piston assembly including a piston having a surface area $A_2$;

a by-pass conduit defining a mud flow path by-passing said orifice and through said piston assembly;

a pilot valve for enabling and disabling mud flow through said by-pass conduit; and a plurality of pressure relief valves in said by-pass conduit;

wherein each of said pressure relief valves is set with a different relief pressure to enable said mud pulser to generate an acoustic signal with more than two amplitude levels.

21. A mud pulser for an MWD system, comprising;

an orifice;

a poppet movably positioned with respect to said orifice, said poppet having a face with a surface area $A_1$; and a piston assembly connected to said poppet for controlling the position of said poppet relative to said orifice, said piston assembly including a piston having a surface area $A_2$;

a by-pass conduit defining a mud flow path by-passing said orifice and through said piston assembly;

a pilot valve for enabling and disabling mud flow through said by-pass conduit; and a motor operated pressure relief valve in said by-pass conduit;

wherein said motor operated pressure relief valve is capable of being set with a variety of different relief pressure values to enable said mud pulser to generate an acoustic signal with more than two amplitude levels.

22. A mud pulser as in claim 21, wherein said motor operated pressure relief valve includes a spring for setting the relief pressure.

23. A mud pulser as in claim 22, wherein said spring connects to a variable torque motor for changing the force applied to said spring.

24. A mud pulser as in claim 21, wherein said mud pulser is capable of generating a frequency shift keyed signal.

25. A mud pulser as in claim 21, wherein said mud pulser is capable of generating a phase shift keyed signal.

26. A mud pulser as in claim 21, wherein said mud pulser is capable of generating a quadrature amplitude modulation signal.

27. A transmitter assembly for a mud pulse telemetry system, comprising:

an outer housing;

an orifice positioned within said housing;

a poppet movably positioned within said housing with respect to said orifice to affect mud flow through said orifice;

a piston assembly connected to said poppet for controlling the position of said popper relative to said orifice;

a by-pass conduit defining a mud flow path by-passing said orifice, said by-pass conduit including a passage through said piston assembly;

a pilot valve for enabling and disabling mud flow through said by-pass conduit; and a pressure control valve connected in said by-pass conduit for defining the maximum mud pressure generated by said transmitter assembly.

28. A transmitter assembly as in claim 27, wherein mud flow through said by-pass conduit creates a force on said piston assembly, causing said piston assembly to extend and shut said poppet with respect to said orifice.

29. A transmitter assembly as in claim 28, wherein the mud pressure generated when said poppet is closed is determined by said pressure relief valve.

30. A transmitter assembly as in claim 29, wherein said poppet is retracted with respect to said orifice when said pilot valve disables mud flow through said by-pass conduit.

31. A transmitter assembly as in claim 30, wherein said poppet has a face with a surface area $A_1$, and said piston assembly includes a piston with a surface area of $A_2$.

32. A transmitter assembly as in claim 31, wherein $A_2$ is greater than $A_1$.

* * * * *